United States Patent Office 2,738,364
Patented Mar. 13, 1956

2,738,364

PRODUCTION OF ACRYLIC ACID ESTERS

Walter Reppe and Walter Schweckendiek, Ludwigshafen (Rhine), and Herbert Friederich, Worms, Germany, assignors to Badische Anilin- & Soda-Fabrik Aktiengesellschaft, Ludwigshafen am Rhine, Germany No Drawing. Application May 17, 1952,
Serial No. 288,534

Claims priority, application Germany June 5, 1951

16 Claims. (Cl. 260—486)

The present invention relates to the production of acrylic acid esters and, more particularly, to the synthesis of acrylic esters by the interaction of acetylene, carbon monoxide and alcohols in the presence of a novel type of carbonylation catalysts.

It is known that acrylic acid and its functional derivatives may be prepared by the interaction of acetylen and carbon monoxide with compounds having a replaceable hydrogen atom, such as water, alcohols, carboxylic acids, mercaptans, ammonia and amines. The carbon monoxide taking part in the carbonylation may be brought into the reaction in the form of metal carbonyls. This type of carbonylation is called the stoichiometric method. The process may also be carried out catalytically while using carbon monoxide as such. In this case a catalyst has to be present. It has already been proposed to use complex triphenyl phosphine-nickel halide compounds as catalysts. (See Walter Reppe, "Neue Entwicklungen auf dem Gebiet der Chemie des Acetylens und Kohlenoxyds," Springer-Verlag, 1949.)

It is an object of our invention to improve the carbonylation of acetylene to acrylic acid derivatives according to the catalytic method. A further object of our invention is to provide novel catalysts for this reaction. These catalysts allow to carry out the carbonylation with better yields and under less energetic conditions than were hitherto necessary.

We have found, and this constitutes the object of our invention, that such complex nickel compounds are very efficient catalysts for the carbonylation of acetylene to acrylic acid compounds as contain the nickel in complex combination with an organic ammonium compound containing at most one hydrogen atom attached to the nitrogen atom.

Suitable catalysts of this type are available according to the processes described in our copending application "Complex Nitrogen-Containing Metal Salts," Ser. No. 286,802, filed May 8, 1952, and now abandoned. We prefer to use as catalysts such compounds which are derived from heterocyclic tertiary amines, such as pyridine, homologues of pyridine, and quinolines. We may also use catalysts derived from tertiary aliphatic, cyclo-aliphatic, araliphatic or aromatic amines, or amines having a substituent belonging to more than one of the above-mentioned classes.

The complex salts used as catalysts should contain at least one of these organic bases in the form of an ammonium radical. The ammonium radical may be tertiary, as it is in the case of ammonium compounds prepared by the addition of a hydrogen halide to a tertiary amine. The ammonium radical may, however, as well be derived from a quaternary ammonium compound as they are obtained by the addition of organic halogen compounds to tertiary amines.

The catalysts preferably contain the salt of nickel with a hydrogen halide or pseudo-halide. To list a few examples of the type of catalyst, we refer to N-butyl pyridinium nickel bromide of the formula

[C₅H₅N.C₄H₉]₂[NiBr₄]

or dimethyl phenyl ethyl ammonium nickel chloride of the formula [(CH₃)₂.(C₆H₅).(C₂H₅)N]₂.[NiCl₄]. We may also use salts containing in the molecule a tertiary amine in addition to an ammonium radical, e. g. a compound of the composition

[C₅H₅N.C₄H₉].[C₅H₅N].[NiBr₃]

In the compounds listed above the pyridine radical may be replaced by other heterocyclic nitrogen compounds or by other tertiary amines of the types referred to above. The chlorine and bromine radicals may be replaced by iodine or cyanide or rhodanide.

The novel catalysts may be used in combination with complex tertiary phosphine nickel salts, e. g. with triphenyl phosphine nickel bromide [(C₆H₅)₃P]₂.NiBr₂ or with quaternary phosphonium compounds derived therefrom, e. g. triphenyl methyl phosphonium nickel chloride

[(C₆H₅)₃(CH₃)P]₂.[NiCl₄].

We may also used mixed complex salts, containing simultaneously radicals of amines and phosphines. Such a compound is for example the triphenyl butyl phosphonium pyridine nickel bromide of the formula

[(C₆H₅)₃.(C₄H₉)P]₂.[C₅H₅N].[NiBr₄]

and the triphenyl butyl phosphine pyridinium nickel bromide of the formula $$\left[ \begin{array}{c} (C_5H_5N.C_4H_9) \\ (C_6H_5)_3P \end{array} \right] NiBr_2$$

The complex nickel salts used as catalysts in our invention may be prepared in the manner described in our copending application Ser. No. 286,802 and now abandoned "Complex Nitrogen-Containing Metal Salts." This process consists in simultaneously or subsequently heating together in the liquid phase the components forming the various radicals of the complex salts. The salts are generally well crystallized, stable compounds which are soluble in organic solvents, such as alcohols, esters, lactones, ethers and the like. They may be charged to the reaction mixture in the form of their solutions in such solvents, and they may be recovered from the reaction product in the form of such solutions. Consequently, it is very simple to use the catalysts again and again in the acrylic ester synthesis.

It is also possible to produce the catalysts in situ which means that we charge the reaction vessel to be used in the carbonylation with the ingredients necessary for forming the catalyst and producing it within the reaction vessel.

The starting materials for our invention are acetylene and carbon monoxide. Among the alcohols we prefer to use aliphatic saturated monovalent alcohols containing not more than 18 carbon atoms, such as ethanol, isobutanol, 2-ethyl hexanol, dodecanol, ethylene glycol monomethyl or ethyl ether and the homologues of these compounds.

The reaction runs smoothly and successfully with the aid of our catalysts at temperatures exceeding 80° C., preferably between 80° and 250° C. To facilitate the reaction, we work under increased pressure, preferably at pressures exceeding 5 atmospheres and, for safety reasons, at pressures between 5 and 30 atmospheres. We may use higher pressures, provided that the acetylene is strongly diluted by other gases, for example when working with a carbon monoxide-acetylene mixture containing a substantial excess of carbon monoxide. The partial pressure of acetylene under the reaction conditions should not be lower than 5 atmospheres.

We may carry out the reaction discontinuously in the conventional high pressure autoclaves, lined with suitable material. We may also carry out the reaction in a continuous manner according to the various methods known in the art. In both cases we may apply the catalysts in dissolved or suspended state or rigidly arranged.

In a continuous operation we may allow the reaction liquid to flow downwards through a vertical high pressure vessel which is charged with a catalyst or filler bodies or similar installations so that the liquid trickles over the catalyst or the filler bodies while the gas is led in direct or countercurrent to the liquid. We may also lead the liquid through such a vessel upwards together with the gas and provide the catalyst in a dissolved or solid state so that it is continuously led through the reaction zone together with the starting materials. The carbon monoxide and the acetylene may be used as circulating gas.

Suitable solvents for the process are preferably the liquid starting materials themselves, for example the alcohols. We may use also other solvents, such as hydrocarbons, ethers, lactones or the reaction products, but the use of the alcohols is preferred.

The following examples will further illustrate how our invention may be carried out.

The parts are by weight.

*Example 1*

An autoclave made from stainless steel is charged with 50 parts of methanol and 3 parts of a catalyst containing 1 part of triphenyl butyl phosphonium bromide, 1 part of pyridinium butyl bromide and 2 parts of nickel bromide. After having added 3 parts of pyridine and replaced the air by nitrogen the autoclave is heated to 160° C., and a mixture of equal parts by volume of carbon monoxide and acetylene, having a total pressure of 30 atmospheres is pressed in. The reaction is carried out at this temperature for 24 hours while maintaining the pressure by replenishing the gas mixture consumed.

The reaction mixture is allowed to cool and the pressure released. The increase in weight amounts to 30 parts. By distilling the reaction mixture 68 parts of a 48 per cent solution of methyl acrylate in methanol are obtained. The distillation residue (9 parts) contains the catalyst in the form of crystals. It may be filtered off by suction and used for another batch.

*Example 2*

In the manner described in Example 1, 50 parts of ethanol are treated with acetylene and carbon monoxide at 160° C. and under 30 atmospheres. 3 parts of an equimolecular mixture of pyridinium butyl bromide and nickel bromide are used as the catalyst. The increase in weight amounts to 44 parts in the course of 24 hours. Distillation of the reaction mixture yields 80 parts of a 68 per cent solution of ethyl acrylate in ethanol.

The catalyst contained in the distillation residue is filtered off by suction and used again for reaction between 50 parts of ethanol with acetylene and carbon monoxide in the manner described above. 78 parts of a 58.5 per cent solution of ether acrylate in ethanol are obtained after distillation.

*Example 3*

In the manner described in Example 1, 80 parts of n-butanol are treated with acetylene and carbon monoxide at 170° C. and under 30 atmospheres in the presence of 3 parts of the complex compounds consisting of triphenyl butyl phosphonium bromide, pyridinium butyl bromide and nickel bromide. Distillation of the reaction products yields 100 parts of a 65 per cent solution of butyl acrylate in butanol.

*Example 4*

To a mixture of 50 parts of butanol and 50 parts of γ-butyrolactone with 3 parts of a butylene-1.4-dipyridinium nickel tetra chloride [C₅H₅N—CH₂CH₂—]₂NiCl₄ (M. P.=260° C.) a mixture of equal parts of acetylene and carbon monoxide under 30 atmospheres is pressed at 160° C. After 50 hours the weight has increased by 50 parts. The reaction mixture is then distilled yielding 86 parts of 100 per cent of butyl acrylate. The distillation residue contains γ-butyrolactone. When half of this is distilled off the catalyst precipitates in the form of greenish-blue crystals which may be recovered and used again.

We claim:

1. In the manufacture of an acrylic acid ester by the interaction of acetylene with carbon monoxide and an alcohol at elevated temperature and under increased pressure, the step which comprises carrying out the reaction in the presence of a compound containing in complex combination nickel, a quaternary ammonium radical and a member selected from the group consisting of halide, cyanide and rhodanide radicals.

2. In the manufacture of an acrylic acid ester by the interaction of acetylene with carbon monoxide and an alcohol at elevated temperature and under increased pressure, the step which comprises carrying out the reaction in the presence of a complex nickel compound of the general formula

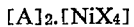
$$[A]_2 \cdot [NiX_4]$$

wherein A is a quaternary ammonium radical and X is selected from the group consisting of halide, cyanide and rhodanide radicals.

3. In the manufacture of an acrylic acid ester by the interaction of acetylene with carbon monoxide and an alcohol at elevated temperature and under increased pressure, the step which comprises carrying out the reaction in the presence of a complex nickel compound of the general formula

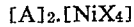
$$[A]_2 \cdot [NiX_4]$$

wherein A is a quaternary ammonium radical and X is a halide radical.

4. In the manufacture of an acrylic acid ester by the interaction of acetylene with carbon monoxide and an alcohol at elevated temperature and under increased pressure, the step which comprises carrying out the reaction in the presence of a complex nickel compound of the general formula

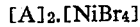
$$[A]_2 \cdot [NiBr_4]$$

wherein A is a quaternary ammonium radical.

5. In the manufacture of an acrylic acid ester by the interaction of acetylene with carbon monoxide and an alcohol at elevated temperature and under increased pressure, the step which comprises carrying out the reaction in the presence of a mixture of a complex nickel compound of the general formula

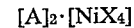
$$[A]_2 \cdot [NiX_4]$$

wherein A is a quaternary ammonium radical and X is a halide radical and a complex nickel compound of the general formula $$[Ph]_2 \cdot [NiX'_4]$$

wherein Ph is a quaternary phosphonium radical and X' is a halide radical.

6. A process for the manufacture of an acrylic acid ester which comprises heating at a temperature between about 150° C. and 250° C. and under a pressure exceeding 5 atmospheres an aliphatic monovalent saturated alcohol having from one to four carbon atoms with carbon monoxide and acetylene in the presence of a complex nickel compound of the general formula

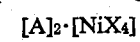
$$[A]_2 \cdot [NiX_4]$$

wherein A is a quaternary ammonium radical and X is a halide radical.

7. A process as set forth in claim 6 wherein X is bromine.

8. A process as set forth in claim 6 wherein A is an N-alkylpyridinium radical and X is bromine.

9. A process for the manufacture of an acrylic acid ester which comprises heating at a temperature between about 150° C. and 250° C. and under a pressure exceeding 5 atmospheres an aliphatic monovalent saturated alcohol having from one to four carbon atoms with carbon monoxide and acetylene in the presence of a mixture of a complex nickel compound of the general formula $$[A]_2 \cdot [NiX_4]$$

wherein A is a quaternary ammonium radical and X is a halide radical and a complex nickel compound of the general formula $$[Ph]_2 \cdot [NiX'_4]$$

wherein Ph is a quaternary phosphonium radical and X' is a halide radical.

10. A process set forth in claim 9 wherein each of X and X' is bromine.

11. A process for the manufacture of an acrylic acid ester which comprises heating at a temperature between about 150° C. and 250° C. and under a pressure exceeding 5 atmospheres an aliphatic monovalent saturated alcohol having from one to four carbon atoms with carbon monoxide and acetylene in the presence of a mixture of a complex nickel compound of the general formula $$[A]_2 \cdot [NiX_4]$$

wherein A is an N-alkylpyridinium radical and X is a halide radical and a pyridine.

12. A process as set forth in claim 11 wherein X is bromine.

13. In the manufacture of an acrylic acid ester by the interaction of acetylene with carbon monoxide and an alcohol at elevated temperature and under increased pressure, the step which comprises carrying out the reaction in the presence of a complex nickel compound of the general formula $$[A]_2 \cdot [NiX_4]$$

wherein A is an N-lower alkyl pyridinium radical and X is a halide radical.

14. In the manufacture of an acrylic acid ester by the interaction of acetylene with carbon monoxide and an alcohol at elevated temperature and under increased pressure, the step which comprises carrying out the reaction in the presence of a complex nickel compound of the formula $$[C_5H_5N \cdot C_4H_9]_2 \cdot NiBr_4$$

15. In the manufacture of an acrylic acid ester by the interaction of acetylene with carbon monoxide and an alcohol at elevated temperature and under increased pressure, the step which comprises carrying out the reaction in the presence of a mixture of a complex nickel compound of the formula $$[C_5H_5N \cdot C_4H_9]_2 \cdot NiBr_4$$

and a complex nickel compound of the formula $$[(C_6H_5)_3(C_4H_9)P]_2 \cdot NiBr_4$$

16. In the manufacture of an acrylic acid ester by the interaction of acetylene with carbon monoxide and an alcohol at elevated temperature and under increased pressure, the step which comprises carrying out the reaction in the presence of a complex nickel compound of the formula $$[C_5H_5N-CH_2CH_2-]_2 \cdot NiCl_4$$

References Cited in the file of this patent

Copenhaver et al.: Acetylene and Carbon Monoxide Chemistry, Reinhold (1949), pages 259–265, 296–197.